July 15, 1952     H. I. MANDOLF ET AL     2,603,474
WEIGHING AND MEASURING DEVICE
Filed Aug. 19, 1946
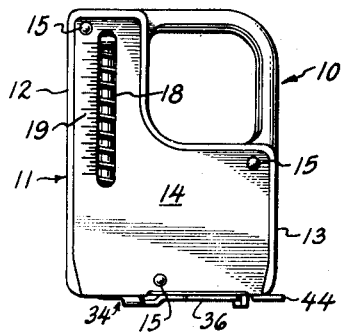
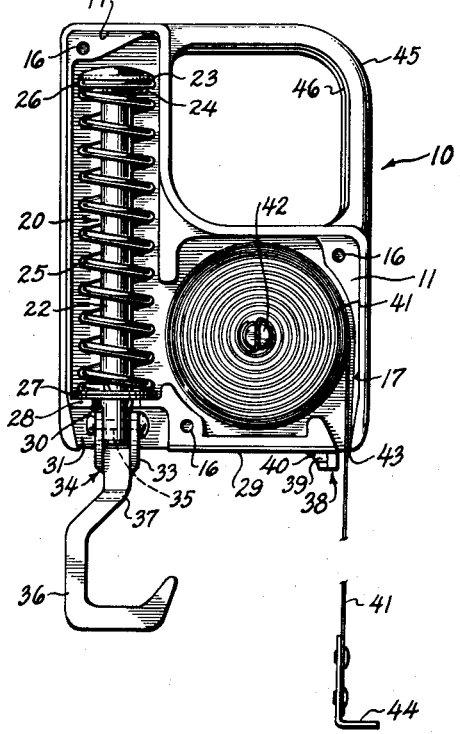
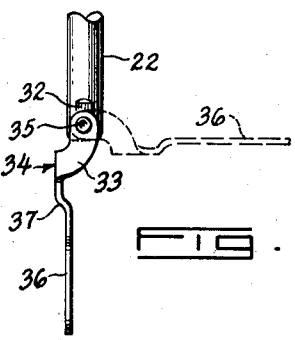
INVENTORS
Henry I. Mandolf
BY & John B. Morrow
Thomas P. Mahoney Patented July 15, 1952

2,603,474

UNITED STATES PATENT OFFICE 2,603,474

WEIGHING AND MEASURING DEVICE

Henry I. Mandolf and John B. Morrow, San Diego, Calif., assignors to Langley Corporation, San Diego, Calif., a corporation of California Application August 19, 1946, Serial No. 691,524

3 Claims. (Cl. 265—63)

This invention relates to improvements in measuring and weighing devices and more particularly to a combination weight scale and flexible rule incorporated in a common housing in such a manner that both the weight scale and flexible rule are adapted to be used cooperatively to simultaneously measure and weigh an object suspended on said weight scale.

Devices of similar size and capacity have been developed in the past to provide a ready and portable means for weighing such objects as fish and packages and for general household use but have been of such physical conformation as to be difficult to hold when a heavy object was suspended on the weight scale to be weighed thereby.

In addition, the customary projecting hook or similar suspension device associated with customary weight scales has militated against their common and popular use since when placed in a fish tackle box the hook tends to become entangled in leader and line and if carried in the pocket of the user frequently catches in his pocket and tears it.

Further, in previous devices of a similar nature the weight scale was so housed as to be both cumbersome and difficult to carry if it was desired to utilize them for portable use.

It is, therefore, generally an object of this invention to provide a combined weight scale and rule which are adapted to be utilized conjointly and in reference to each other, in such a manner that simultaneous and corroborative measurements may be taken and recorded in one use of the scale.

Another object of the invention is the provision of a combined measuring rule and weighing scale having a unitary housing in which said rule and said scale are so distributed as to be readily utilized in conjunction with and separately from each other.

An additional object of the invention is the provision of a combined weighing and measuring scale having a unitary housing in which is embodied an integral handle or grasping means adapted to permit the housing to be easily and securely suspended in the hand of the user.

A further object of the invention is the provision of a combined weighing and measuring instrument in which the suspensory means associated with the weighing scale is adapted to be pivotally rotated on its vertical axis and retracted at a right angle to said axis.

Another object of the invention is the provision of a measuring and weighing instrument having a unitary housing embodying stowage or catch means adapted to removably secure the suspensory means associated with the weighing portion of the instrument against the housing in such a manner that the instrument will be more easily carried and used.

An additional object of the invention is the provision of a weighing and measuring instrument which is so designed and constructed as to be easily and cheaply manufactured.

Other objects and advantages of the invention will be made apparent by a consideration of the specification and the accompanying drawing, in which:

Figure 1 is a front elevational view of a weighing and measuring instrument constructed in accordance with this invention;

Figure 2 is a front elevational view of the weighing and measuring instrument with its face or cover plate removed to expose to view the detailed construction of its component parts;

Figure 3 is a bottom plan view of the weighing and measuring instrument showing the manner in which the suspensory means associated with the weighing mechanism is retracted and retained against the housing of the instrument; and Figure 4 is a detail view showing the construction of the suspensory means associated with the weighing mechanism and, in dotted lines, the manner in which it pivots at a right angle to the vertical axis of the mechanism.

In Figure 1 of the drawing there is shown a weighing and measuring instrument 10, constructed in accordance with this invention, which embodies an integral housing or casing 11 having a substantially vertical portion 12 and a substantially horizontal portion 13 associated with said vertical portion 12.

The front portion of the housing or casing 11 has a face or cover plate 14 affixed thereto as by rivets 15 or similar fastening means which are driven into holes 16 formed in the body of the housing 11. The cover plate 14 is seated on the forward portion of the housing 11 within a peripheral flange, rim or lip 17 and has a vertical slot or orifice 18 cut through it in that section of its area which overlies the upper part of the vertical portion 12 of housing 11. Associated with the slot 18 are indicia 19 which are adapted to indicate the deflection of the weighing mechanism 20 which is housed in the vertical portion 12 of the housing 11. The weighing mechanism or weight scale 20 comprises a vertical shaft or rod 22 having formed or positioned on its extreme upper end a head 23 which has a shoulder 24 cut or otherwise formed in its edge. Positioned about the vertical shaft or rod 22 is a compression type spring 25 which has its upper end 26 wound about and seated on the shoulder 24 and its lower end seated on a number of washers or shims 27 which rest on an inwardly struck portion or wall 28 of the base 29 of the housing 11. The lower end of the shaft or rod 22 projects through an indent 30 formed in the instruck portion 28 of base 29 into a chamber 31 into which the lower end of the shaft 22 is retracted when no weight is borne upon the weighing mechanism 20. Flats 32 are formed on two sides of the extreme lower end of shaft 22 against which are secured by means of a pin 35 running through the shaft 22 the two sides 33 of a yoke 34.

Yoke 34 is formed integrally with suspensory or weight bearing means 36 and is connected thereto by means of an integral joggled portion 37. Since head 23 is so designed that it will register the deflection of spring 25 as against indicia 19 contiguous to slot 18 in cover plate 14 when a weight is placed upon suspensory means 36 no conventional arrow or pointer which will project through slot 17 is needed and shaft or rod 22 can be rotated on its vertical axis to permit the rotation of a weight suspended or suspensory means 36 for a purpose to be indicated below.

Integrally formed with the bottom 29 of casing 11 is a projecting catch or stowage means 38 which has an under cut slot 39 formed therein and a back wall 40 adapted to serve as a stop. Since suspensory means 36 is pivotally suspended by means of yoke 34 and pin 35 upon the lower end of shaft 22 and since shaft 22 can be rotated on its vertical axis, suspensory means 36 can be rotated on the axis of shaft 22 and pivoted upon pin 35 at a right angle to shaft 22 simultaneously with said rotation. Thus suspensory means 36 can be brought into contact with the bottom wall 29 of housing 11 and slid into nested position within stowage means 38 wherein it will be retained by means of the combined action of slot 39 and back wall 40 which serves to limit the movement of the suspensory means 36 within slot 39. Obviously, the complete retraction of suspensory means 36 against the bottom 29 of housing 11 is only to be achieved by the provision of chamber 31 in which yoke 34 on which suspensory means 36 is hung can be positioned when suspensory means 36 is retracted. If chamber 31 were not provided yoke 34 would project upwardly from the base 29 of casing 11 and a smooth profile devoid of projections upon which clothing could catch would not be obtained. There is thus achieved by the construction described in detail above a new and novel means of stowing or securing the suspensory means associated with the weighing mechanism which eliminates the annoyance and inconvenience of having the suspensory means catch in the clothing of the user or of becoming entangled in the lines or leaders in a tackle box.

Located in the substantially horizontal portion 13 of housing 11 is a flexible rule 41 of conventional spring-back type which is secured therein upon an integral bifurcated boss 42 which projects from the back wall of housing 11. An opening or slot 43 is formed in the bottom wall 29 of housing 11 through which the ruled portion of flexible rule 41 is adapted to project and be drawn by means of tab and stop means 44. Tab and stop means 44 is adapted both to aid in the withdrawal of the flexible rule 41 and to prevent its complete withdrawal within housing 11 by abutting against the bottom 29 of housing 11 immediately adjacent to slot 43 therein.

To permit the measuring and weighing device to be securely and easily held in the hand of the user there is provided a finger-gripping or holding means 45 which is formed integrally with housing 11 which bears on its inner surface a series of serrations 46 which are designed to prevent the device from slipping out of the hands of the user. Thus, when an object is to be weighed on the weighing mechanism 20 and simultaneously measured on flexible rule 41 one hand can be freed to control the rule while the other holds the device. Obviously, such integral holding means are far superior to conventional rings and similar devices which permit the weight scales associated therewith to twist and turn in the hand of the user.

In order to indicate the manner in which weight scale 20 and flexible rule 41 can be used conjointly and cooperatively its action will be illustrated in the weighing and measuring of a fish. Suspensory means 36 is released from contact with the bottom of housing 11 and the fish is placed thereupon. To permit the flexible rule 41 to be laid on that segment of the fish where the most accurate indication of its length may be obtained suspensory means 36 and shaft 22 are rotated on the vertical axis of shaft 22. Flexible rule 41 is then withdrawn from the housing 11 by the free hand of the user. Thus, if photographic evidence of the true weight and length of the fish is desired it can be obtained by the cooperative and conjoint action of the elements embodied in the device. In addition, the immediate juxtaposition of the flexible rule to the weight scale permits an accurate measurement and adjustment to be made for the deflection caused in the weight scale by the burden of the fish upon it. It is thus apparent that results may be achieved from the conjoint action of the elements embodied in the device which could not be gained by the use of two separate instruments.

There is thus provided in this invention a portable, compact and readily usable weighing and measuring device which embodies means for retracting the suspensory means associated with its weighing mechanism.

It is, of course, apparent to those skilled in the art that the above described mechanism has been utilized to indicate the manner of use and mode of construction of the invention and it is obvious that changes can be made in details of construction which would still fall within the scope of the appended claims.

We claim:

1. In a weighing instrument, an integral housing having one side thereof open, a cover for closing said open side, said cover having a slotted opening therein, indicia on said cover located adjacent said slotted opening, weighing means disposed within said housing, said weighing means comprising an elongated rod member movably positioned within said housing adjacent said slotted opening, an enlarged portion on said rod member viewable through said slotted opening to serve as an indicator on movement of said rod member, spring means within said housing carried by said rod member and having one end seating against said enlarged portion and the opposite end adjacent an interior wall portion provided by the housing whereby said rod member is supported for rotative movement freely about its longitudinal axis and is positioned for movement in the direction of its longitudinal axis against the bias of said spring means, an end of said rod member adapted to project through the bottom wall of said housing to the exterior thereof to lie normally within a recess provided in said bottom wall of the housing, hook means disposed exteriorly of said housing with its mounting end positioned normally within said bottom wall recess, means pivotally connecting the mounting end of said hook means to said projecting end of said rod member, and a portion integral with the bottom wall of the housing projecting therefrom and having a slot therein into which said hook means is movable to be supported in stowed position contiguous to said bottom wall of the housing and at an angle to said rod member.

2. In a weighing instrument, an integral housing comprising a vertical portion and a horizontal portion, a gripping means integral with said housing extending from said vertical portion to said horizontal portion and defining an opening into which a finger may be inserted, weighing means disposed within a chamber provided by said housing, said weighing means embodying a movable rod member having an end adapted to project to the exterior of the housing, spring means within said housing carried by said rod member and adapted to be compressed upon movement of the rod member, a load supporting suspensory means disposed exteriorly of said housing below the bottom wall thereof, means pivotally connecting said suspensory means to said projecting end of the rod member, means for supporting said rod movement for rotative movement freely about its longitudinal axis and for movement in the direction of its longitudinal axis against the bias of said spring means, and a portion integral with the bottom wall of the housing projecting therefrom and having a slot therein into which said hook means is movable to be supported in stowed position contiguous to said bottom wall of the housing and at an angle to said rod member.

3. In a weighing instrument, an integral housing comprising a vertical portion and a horizontal portion and having an open side, a gripping means integral with said housing extending from said vertical portion to said horizontal portion and defining an opening into which a finger may be inserted for supporting the housing, a cover for closing said open side, said cover having a slotted opening therein, indicia on said cover located adjacent said slotted opening, weighing means disposed within said housing, said weighing means comprising an elongated rod member movably positioned within a chamber in said housing and adjacent said slotted opening, an enlarged portion on said rod member viewable through said slotted opening to serve as an indicator on movement of said rod member, spring means within said housing carried by said rod member and having one end seating against said enlarged portion and the opposite end adjacent an interior wall portion provided by the housing whereby said rod member is supported for rotative movement freely about its longitudinal axis and is positioned for movement in the direction of its longitudinal axis against the bias of said spring means, an end of said rod member adapted to project through the bottom wall of said housing to the exterior thereof to be normally within a recess provided in said bottom wall of the housing, hook means disposed exteriorly of said housing having a yoke portion positioned normally within said bottom wall recess, means pivotally connecting said yoke portion of the hook means to the projecting end of the rod member, and a portion integral with the bottom wall of the housing projecting therefrom and having a slot therein into which said hook means is movable to be supported in stowed position contiguous to said bottom wall of the housing and at an angle to said rod member.

HENRY I. MANDOLF.
JOHN B. MORROW.

REFERENCES CITED

The following references are of record in the file of this patent:

UNITED STATES PATENTS

| Number | Name | Date |
| --- | --- | --- |
| 209,180 | Miles | Oct. 22, 1878 |
| 230,592 | Williamson | July 27, 1880 |
| 735,003 | Ward | July 28, 1903 |
| 931,812 | Tippery | Aug. 24, 1909 |
| 960,535 | Gilfillan | June 7, 1910 |
| 1,017,596 | Sabin et al. | Feb. 13, 1912 |
| 1,031,917 | Dennison | July 9, 1912 |
| 1,174,526 | Stoddart | Mar. 7, 1916 |
| 1,233,034 | Crogan | July 10, 1917 |
| 2,458,811 | Koscielski | Jan. 11, 1949 |

FOREIGN PATENTS

| Number | Country | Date |
| --- | --- | --- |
| 734 | England | July 20, 1911 |
| 257,196 | Germany | Mar. 1, 1913 |